United States Patent
Zheng et al.

(10) Patent No.: US 11,620,747 B2
(45) Date of Patent: Apr. 4, 2023

(54) METHOD AND SYSTEM FOR IMAGE SEGMENTATION USING A CONTOUR TRANSFORMER NETWORK MODEL

(71) Applicant: Ping An Technology (Shenzhen) Co., Ltd., Shenzhen (CN)

(72) Inventors: Kang Zheng, Bethesda, MD (US); Yuhang Lu, Bethesda, MD (US); Weijian Li, Bethesda, MD (US); Yirui Wang, Bethesda, MD (US); Adam P Harrison, Bethesda, MD (US); Le Lu, Bethesda, MD (US); Shun Miao, Bethesda, MD (US)

(73) Assignee: PING AN TECHNOLOGY (SHENZHEN) CO., LTD., Shenzhen (CN)

(*) Notice: Subject to any disclaimer, the term of this patent is extended or adjusted under 35 U.S.C. 154(b) by 262 days.

(21) Appl. No.: 17/128,993

(22) Filed: Dec. 21, 2020

(65) Prior Publication Data

US 2021/0287362 A1    Sep. 16, 2021

Related U.S. Application Data

(60) Provisional application No. 62/988,628, filed on Mar. 12, 2020.

(51) Int. Cl.
*G06T 7/10* (2017.01)
*G06T 7/00* (2017.01)

(52) U.S. Cl.
CPC .............. *G06T 7/0012* (2013.01); *G06T 7/10* (2017.01); *G06T 7/97* (2017.01); *G06T 2207/30008* (2013.01); *G06T 2207/30061* (2013.01)

(58) Field of Classification Search
CPC .......... G06T 7/0012; G06T 7/10; G06T 7/97; G06T 2207/30008; G06T 2207/30061; G06T 2207/10072; G06T 2207/10116; G06T 2207/20081; G06T 2207/20084; G06T 7/12

See application file for complete search history.

(56) References Cited

U.S. PATENT DOCUMENTS

2019/0188848 A1* 6/2019 Madani ................ G06N 3/0445

OTHER PUBLICATIONS

Wenato Zhu, Yufang Huang, Liang Zeng, and Xuming Chen, et al. "AnatomyNet: Deep Learning for Fast and Fully Automated Whole-Volume Segmentation of Head and Neck Anatomy", Published on Dec. 17, 2018; American Association of Physicists in Medicine, pp. 576-589. (Year: 2018).*

(Continued)

*Primary Examiner* — Siamak Harandi
(74) *Attorney, Agent, or Firm* — Anova Law Group, PLLC

(57) ABSTRACT

An image segmentation method includes generating a CTN (contour transformer network) model for image segmentation, where generating the CTN model includes providing an annotated image, the annotated image including an annotated contour, providing a plurality of unannotated images, pairing the annotated image to each of the plurality of unannotated images to obtain a plurality of image pairs, feeding the plurality of image pairs to an image encoder to obtain a plurality of first-processed image pairs, and feeding the plurality of first-processed image pairs to a contour tuner to obtain a plurality of second-processed image pairs.

20 Claims, 13 Drawing Sheets

(56) References Cited

OTHER PUBLICATIONS

Nicholas J. Tustison, Kun Qing, Chengbo Wang, Talissa A. Altes, and John P. Mugler III: "Atlas-Based Estimation of Lung and Lobar Anatomy in Proton MRI"; Published on Jul. 29, 2015; Magnetic Resonance in Medicine 76:315-320 (2016). (Year: 2015).*

* cited by examiner

200

---

S220
GENERATING CTN
(CONTOUR TRANSFORMATION NETWORK)
MODEL

---

S240
SUBJECTING TARGET IMAGE
TO CTN MODEL TO
IDENTIFY TARGET CONTOUR

S2201
PROVIDING ANNOTATED IMAGE
INCLUDING ANNOTATED CONTOUR

S2203
PROVIDING PLURALITY
OF UNANNOTATED IMAGES

S2205
PAIRING ANNOTATED CONTOUR TO EACH OF
PLURALITY OF UNANNOTATED IMAGES TO
OBTAIN PLURALITY OF IMAGE PAIRS

S2207
FEEDING PLURALITY OF IMAGE PAIRS TO IMAGE
ENCODER TO OBTAIN PLURALITY OF FIRST-
PROCESSED IMAGE PAIRS

S2209
FEEDING PLURALITY OF
FIRST-PROCESSED IMAGE PAIRS TO CONTOUR
TUNER TO OBTAIN PLURALITY OF SECOND-
PROCESSED IMAGE PAIRS

S315
PLACING ANNOTATED CONTOUR
AT CENTER PORTION OF EACH OF
PLURALITY OF IMAGE PAIRS

---

S325
SETTING ANNOTATED CONTOUR
AS INITIAL CONTOUR OF EACH OF
UNANNOTATED IMAGES

S417
MARKING ANNOTATED CONTOUR
WITH NUMBER OF VERTICES

---

S427
GENERATING OUTPUT CONTOUR ACCORDING TO
EACH OF PLURALITY OF IMAGE PAIRS

---

S437
DETERMINING VERTICES OFFSET DISTANCES OF
OUTPUT CONTOUR RELATIVE TO NUMBER OF
VERTICES ON ANNOTATED CONTOUR

---

S447
INCLUDING IN PLURALITY OF
FIRST-PROCESSED IMAGE PAIRS INFORMATION ON
VERTICES OFFSET DISTANCES

---
S2201
PROVIDING ANNOTATED IMAGE

---
S2203
PROVIDING UNANNOTATED IMAGES

---
S2205
OBTAINING IMAGE PAIRS

---
S2207
OBTAINING FIRST-PROCESSED IMAGE PAIRS

---
S2209
OBTAINING SECOND-PROCESSED IMAGE PAIRS

---
S2213
SELECTING PORTION OF SECOND-PROCESSED IMAGE PAIR FOR MANUAL CORRECTION

METHOD AND SYSTEM FOR IMAGE SEGMENTATION USING A CONTOUR TRANSFORMER NETWORK MODEL

CROSS-REFERENCE TO RELATED APPLICATION

This application claims the priority of U.S. Provisional Patent Application No. 62/988,628, filed on Mar. 12, 2020, the entire contents of which are incorporated herein by reference.

TECHNICAL FIELD

The present disclosure relates to a technical field of image segmentation, and more particularly of image segmentation of anatomical structures in medical images.

BACKGROUND

Segmenting anatomical structures in medical images, for example, CT (Computed Tomography) images, MM (Magnetic Resonance Imaging) images, and X-rays images, may be used in many areas, including computer-aided diagnosis, radiation therapy planning, and image-guided interventions. Segmentation on anatomical structures using supervised deep learning approaches have achieved successes with relatively higher Intersection-over-Unions (IOUs) performance measures. However, these approaches may be data hungry and often require abundant pixel-level well-annotated patient imaging data for training. In scenarios where expert-driven annotations on these medical images are not readily available, these deep learning approaches may be met with limited use.

The disclosed methods and systems are directed to solve one or more problems set forth above and other problems.

SUMMARY

In one aspect of the present disclosure, an image segmentation method includes generating a CTN (Contour Transformer Network) model for image segmentation, where generating the CTN model includes providing an annotated image, the annotated image including an annotated contour, providing a plurality of unannotated images, pairing the annotated image to each of the plurality of unannotated images to obtain a plurality of image pairs, feeding the plurality of image pairs to an image encoder to obtain a plurality of first-processed image pairs, one of the plurality of first-processed image pairs showing a first output contour with a first vertices offset distance relative to the annotated contour of the annotated image, and feeding the plurality of first-processed image pairs to a contour tuner to obtain a plurality of second-processed image pairs, wherein the one of the plurality of first-processed image pairs corresponds to one of the plurality of second-processed image pairs, and wherein the one of the plurality of second-processed image pairs shows a second output contour with a second vertices offset distance smaller than the first vertices offset distance. While an offset is often a displacement vector, a vertices offset distance defines a space, a gap, or a distance between two corresponding vertices respectively located on each of an image pair.

In another aspect of the present disclosure, an image segmentation apparatus includes a memory and a processor, the processor being configured to perform generating a CTN (Contour Transformer Network) model for image segmentation, where generating the CTN model includes providing an annotated image, the annotated image including an annotated contour, providing a plurality of unannotated images, pairing the annotated image to each of the plurality of unannotated images to obtain a plurality of image pairs, feeding the plurality of image pairs to an image encoder to obtain a plurality of first-processed image pairs, one of the plurality of first-processed image pairs showing a first output contour with a first vertices offset distance relative to the annotated contour of the annotated image, and feeding the plurality of first-processed image pairs to a contour tuner to obtain a plurality of second-processed image pairs, wherein the one of the plurality of first-processed image pairs corresponds to one of the plurality of second-processed image pairs, and wherein the one of the plurality of second-processed image pairs shows a second output contour with a second vertices offset distance smaller than the first vertices offset distance.

In yet another aspect of the present disclosure, a non-transitory computer-readable storage medium is provided for storing a plurality of instructions, wherein the plurality of instructions when executed by a processor causes the processor to generating a CTN (Contour Transformer Network) model for image segmentation, where generating the CTN model includes providing an annotated image, the annotated image including an annotated contour, providing a plurality of unannotated images, pairing the annotated image to each of the plurality of unannotated images to obtain a plurality of image pairs, feeding the plurality of image pairs to an image encoder to obtain a plurality of first-processed image pairs, one of the plurality of first-processed image pairs showing a first output contour with a first vertices offset distance relative to the annotated contour of the annotated image, and feeding the plurality of first-processed image pairs to a contour tuner to obtain a plurality of second-processed image pairs, wherein the one of the plurality of first-processed image pairs corresponds to one of the plurality of second-processed image pairs, and wherein the one of the plurality of second-processed image pairs shows a second output contour with a second vertices offset distance smaller than the first vertices offset distance.

BRIEF DESCRIPTION OF THE DRAWINGS

FIG. 2 is a schematic flow chart diagram of an image segmentation method according to one or more embodiments of the present disclosure;

FIG. 2A is a schematic flow chart diagram showing a variation to the image segmentation method of FIG. 2 according to one or more embodiments of the present disclosure;

FIG. 3 is a schematic flow chart diagram showing a variation to the image segmentation method of FIG. 2A according to one or more embodiments of the present disclosure;

FIG. 4 is a schematic flow chart diagram showing a variation to the image segmentation method of FIG. 2A according to one or more embodiments of the present disclosure;

FIG. 7 is a schematic flow chart diagram showing an alternative to the image segmentation method of FIG. 2A according to one or more embodiments of the present disclosure;

DETAILED DESCRIPTION

In view of the below descriptions of embodiments of the present disclosure in conjunction with the accompanying drawings, aspects, advantages, and prominent features of the present disclosure will become readily apparent to those skilled in the art.

Image segmentation generally aims to partition an object in an image. For biomedical images, the object may be an anatomical structure such as a human knee, a human lung, or a phalanx. A region of interest (ROI) is often a rectangular region placed on the image to contain and allocate the object to be segmented. Accordingly the image is segmented to identify boundaries or contours of the object for a visual interpretation of the object. Image segmentation helps simplify and/or change the representation of an image into something easier to analyze. Medical image segmentation is an important task for identification and location of tumors, diagnosis, and computer guided surgery.

In the medical field, segmentation of anatomical structures is particularly useful. However, due to difficulties in gathering expert-driven annotations, approaches that can perform accurate anatomical structure segmentation without having to rely on deep annotations or large body of annotated datasets are desirable.

Figure 1:
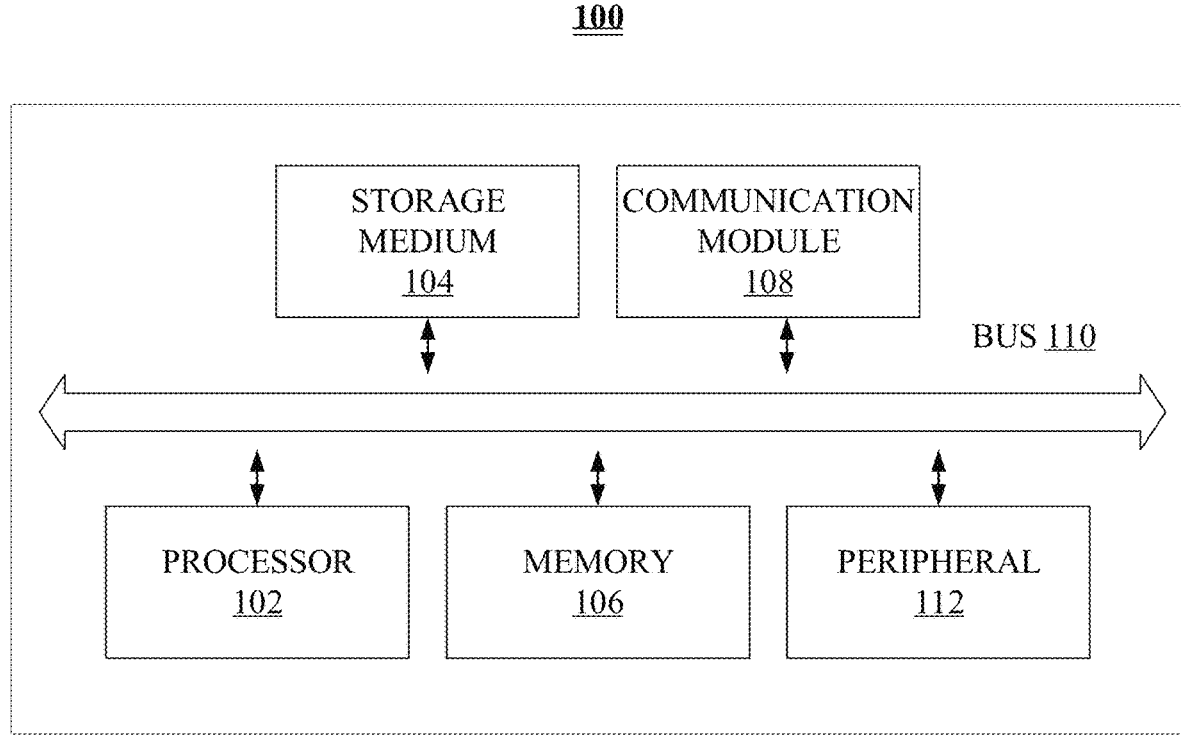
FIG. 1 is a schematic structural diagram of an image segmentation system or apparatus according to one or more embodiments of the present disclosure.

According to certain embodiments of the present disclosure, FIG. 1 is a schematic diagram of an apparatus or a system 100 for performing an image segmentation method such as a method 200 of FIG. 2 to be detailed below. The apparatus 100 may be a computing device including a memory 106 and a processor 102 coupled to the memory 106, the processor 102 being configured to perform a method of image segmentation such as the method 200 of FIG. 2.

The apparatus 100 may also include a non-transitory storage medium 104 including instructions (not shown) which cause the processor 102 to perform a method of image segmentation such as the image segmentation method 200 of FIG. 2. The apparatus 100 may further include a communication module 108 and peripheral devices 112, as necessary. All components 102, 104, 106, 108, and 112 may be in data communication with a bus 110. Certain components may be omitted, and other components may be included.

In certain embodiments, and in view of the image segmentation apparatus 100 of FIG. 1, the present disclosure provides an image segmentation method such as the image segmentation method 200 of FIG. 2. According to FIG. 2, the image segmentation method 200 includes step 220 of generating a CTN (contour transformer network) model for image segmentation. The step 220 in certain embodiments includes one or more of step 2201, step 2203, step 2205, step 2207, and step 2209, as shown in FIG. 2A.

The image segmentation method 200 and the CTN model generated via step 220 of the method 200 are believed to differ from and be advantageous over certain existing methods such as ACMs. For example, ACM is the previous generation method to fit contour to objects in image. The ACM employs an energy term, and searches for the contours that can minimize this energy term on the individual images. The CTN model according to certain embodiments of the present disclosure differs from the ACM in at least two aspects—1) The proposed energy term is novel; and 2) Instead of directly searching for contours on individual images to minimize the energy term, the CTN searches for a neural network that evolutes contours on all unlabeled training data to minimize the energy term.

At step 2201, an annotated image or an exemplar image is provided, where the annotated image includes an annotated contour. The annotated image may be generated by any suitable methods, such as a CT scanner or an X-ray scanner. The annotated contour on the annotated image may be a contour on any suitable structure, including anatomical structure of a human origin, a non-human animal origin, a plant origin, or a non-life origin. In the example of the annotated image being of a medical anatomical structure of a human origin, the annotated contour may be added by or under the guidance of a medical professional, such as a radiologist or a rheumatologist, to manually trace the boundary or contour of the anatomical structure, such as a lung or a portion of a lung, a knee or a portion of a knee, or a phalanx or a portion of a phalanx. The annotated contour may be added via any suitable tool, by hand or computer-assisted drawing or tracing.

In certain embodiments, the term "segmentation" refers to partition of foreground and background of an image.

In certain embodiments, the term "contour" refers to a segmentation, where the contour partitions the image into an inside portion and an outside portion to the contour.

In certain embodiments, the term "annotation" may collectively refer to all marks, all labels, and/or all proposals. Alternatively, the term "marks," the term "labels," and the term "annotations" may be used interchangeably.

In certain embodiments, the word "annotated" is interchangeable with the word "labelled" or the word "marked," and the word "unannotated" is interchangeable with the word "unlabeled" or the word "unmarked."

In certain embodiments, the word "label" may refer to all marks on the images and/or the action of marking or adding marks on the images.

The annotated image may be derived from a raw image that is an orphan image without readily available mechanism for regeneration. In these instances, training a network model using this orphan image for downstream image segmentation, according to one or more embodiments of the present disclosure, is of enhanced advantage.

At step 2203, a plurality of unannotated images is provided. Like the annotated image, the unannotated images may be directed to the same anatomical structure. For example, while the annotated contour on the annotated image traces a human knee or a portion of a human knee, the unannotated images also show a human knee or a portion of a human knee but without the manually annotated contour or traced boundaries of the anatomical structure. Unlike the annotated image, the unannotated images do not have on them an annotated contour such as the annotated contour on the annotated image. In certain embodiments, the unannotated images may be any raw images obtainable from any suitable sources, including public or private image databases, and images generated onsite at hospitals or clinicians' offices.

The plurality of unannotated images may be of any suitable number, dependent on the number of images available on a given anatomical structure and/or a disease indication. Consideration may be given to a cost and labor tradeoff, where training with more images often gives greater accuracy, and yet may also come with unwanted price tag. In certain embodiments, the plurality of unannotated image may be of a number of 2 to 5,000 images, 5 to 2,000 images, 25 to 1,000 images, or 50 to 500 images.

In certain embodiments, step 2201 provides M number of annotated images, and step 2203 provides N number of unannotated images, where M and N are each an integer greater than zero, and N is greater than M. In certain embodiments, a number ratio of N to M may be greater than 10, 50, 100, 250, 500, or 1,000. In certain other embodiments, a number ratio of N to M may be between 2:1 to 5,000:1, 5:1 to 2,000:1, 5:1 to 2,000:1, 25:1 to 1,000:1, or 50:1 to 500:1.

At step 2205, the annotated image is overlaid onto each of the plurality of unannotated images to obtain a plurality of image pairs. The step 2205 may include one or both steps 315 and 325 as shown in FIG. 3. At step 315, the annotated contour is placed at a center portion of each of the plurality of unannotated images. At step 325, the annotated contour is set as an initial contour of each of the unannotated images.

According to step 2205 and further in view of FIG. 3, for example, the plurality of image pairs includes a first image pair and a second image pair. In the first image pair, a copy of the annotated image is paired with a first unannotated image, where the annotated contour is placed at a center portion of the first unannotated image. In the second image pair, a copy of the annotated image is paired with a second unannotated image, where the annotated contour is placed at a center portion of the second unannotated image. The center portion may be or may not be a true center of the unannotated image. The center portion may be determined by any suitable method. For example, a mid-point relative to any two corners along a diagonal line of the unannotated image may be determined as the center portion.

At step 2207, the plurality of image pairs is fed or inputted to an image encoder to obtain a plurality of first-processed image pairs. Any suitable encoder may be used as the image encoder, with a non-limiting example including ResNet-50 and/or a CNN (convolutional neural network). Step 2207 may include one or more of steps 417, 427, 437, and 447, as show in FIG. 4.

At step 417, the annotated contour is formed or defined by one or more vertices. A contour includes a series of vertices. The vertices are not necessarily marked on the contour. The vertices form or define the contour. The vertices serve as points-of-comparison where the unannotated image is compared to the annotated image and assessment on how close the two images pair is conducted. The vertices may be of any suitable number, dependent upon the complexity of the anatomical structure, the type of the disease indication involved, and/or image quality in general. Moreover, step 417 may be performed prior to or after the step of processing via the image encoder, and may even be performed at the step 2201, or step 2203.

At step 427, an output contour is generated according to each of the plurality of image pairs. Continuing with the first and second image pairs from step 2205, after processing via the image encoder, the first and second image pairs are respectively transformed or processed into first-processed first image pair and first-processed second image pair. The difference between the first/second image pair and the first-processed first/second image pair includes one or more vertices shown on the first-processed first/second image that are generated according to a direct comparison to the annotated contour. The one or more vertices are part of the feature map showing the output contour or boundary of the anatomical structure as captured on the unannotated images.

Figures 9, 9A, 9B, 9C, 9D:
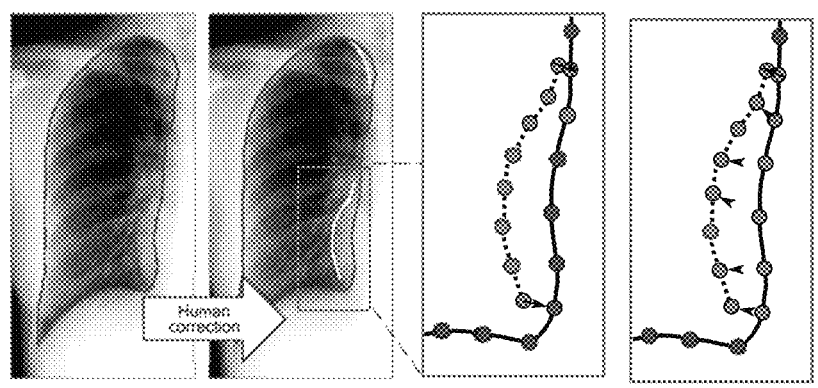
FIG. 9 is a schematic diagram of human-in-the-loop correction as incorporated into the image segmentation method according to one or more embodiments of the present disclosure.

At step 437, vertices offset distances between vertices of the output contour of each of the unannotated images relative to the number of vertices on the annotated contour are determined. Continuing from step 427, the one or more vertices on the first-processed first/second image are assessed for their distances or offsets relative to the annotated contour, with the distances or offsets reflected in the vertices offsets. A non-limiting example of vertices is illustratively depicted FIG. 9C and FIG. 9D. FIG. 9D depicts a reduction in vertices offset distances relative to the corresponding vertices offset distances shown in FIG. 9C, where the arrows are depicted in FIG. 9D to identify where some of the offsets or the displacement vectors may be located for an offsetting operation whereby vertices offset distance becomes smaller after the processing.

At step 447, the plurality of first-processed image pairs is obtained, wherein the plurality of first-processed image pairs includes the number of vertices as determined. The number of vertices as included on the plurality of the first-processed image pairs may include information on the location, space, or distance value between any two vertices, and/or confidence value as to the level of likelihood a particular vertex is an artifact.

Referring back to FIG. 2A, and at step 2209, the plurality of first-processed image pairs is fed or inputted to a contour tuner to obtain a plurality of second-processed image pairs. Continuing with the first-processed first/second image pairs from step 2207, after processing via the contour tuner, the first-processed first/second image pairs are respectively transformed or processed into second-processed first image pair and first-processed second image pair. The difference between the first-processed first/second image pair and the second-processed first/second image pair includes one or more revised vertices shown on the second-processed first/second image that are correspondingly closer to the annotated contour in comparison to the first-processed first/second image pair. The contour tuner may be any suitable contour finetuning device with non-limiting example including a GCN (graph convolutional network).

Figure 5:
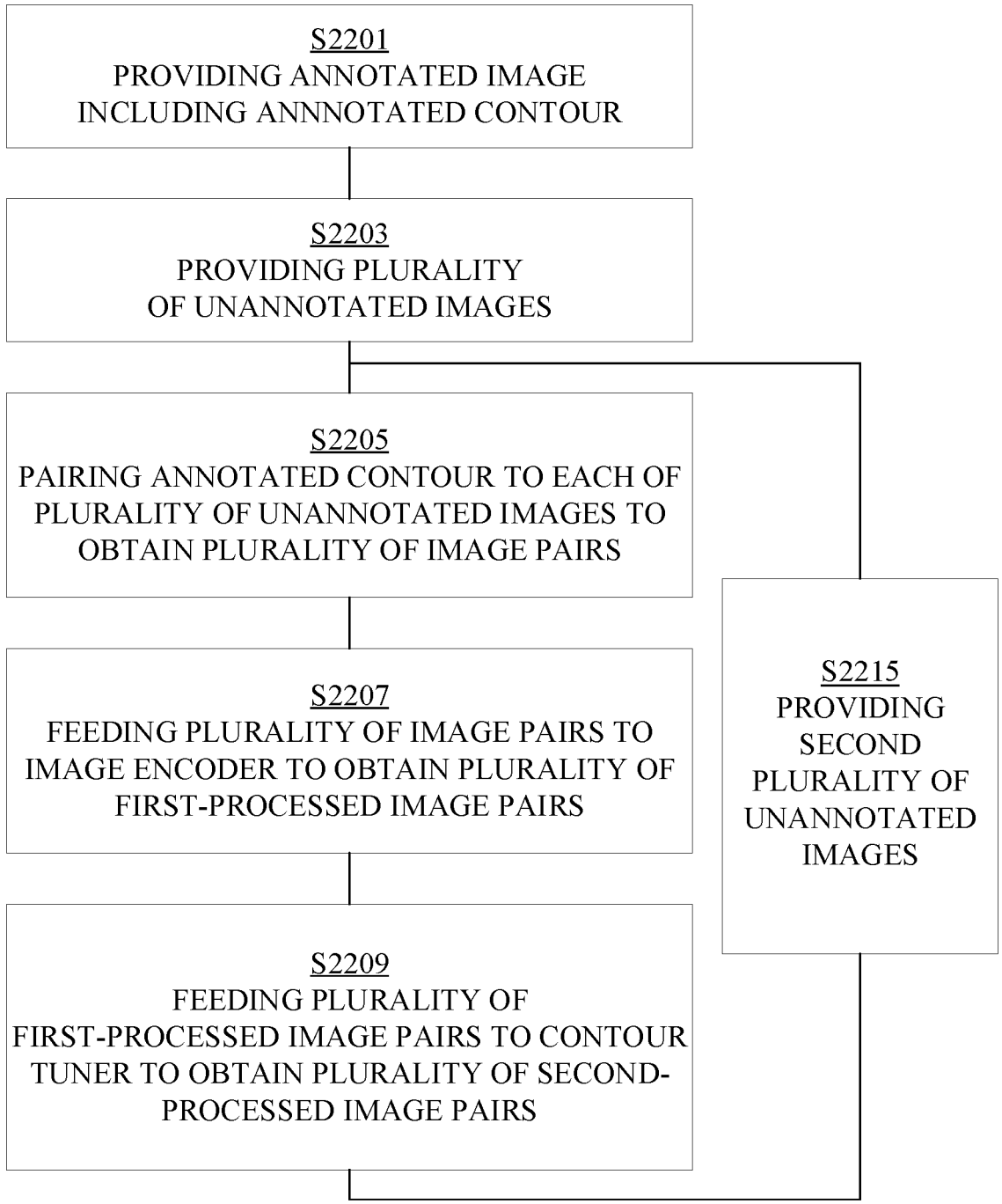
FIG. 5 is a schematic flow chart diagram showing an alternative to the image segmentation method of FIG. 2A according to one or more embodiments of the present disclosure.

FIG. 5 is a flow diagram showing a difference and/or an alternative to the step 220 of FIG. 2A. Continuing from step 2209 of FIG. 2A, an initial CTN model is obtained as an output contour of the step 220. FIG. 5 differs from FIG. 2A by including a loop step 2215.

At step 2215 of FIG. 5, a second plurality of unannotated images is provided. Like the first plurality of unannotated images, the second plurality of unannotated images are directed to the same anatomical structure. Unlike the first plurality of unannotated images, the second plurality of unannotated images have not been seen by the CTN model.

In practical terms, the first plurality and second plurality of unannotated images may be obtained from a same or different imaging procedure, a same or different patient or a group of patients, a same or different disease indication, and/or a same or different image storage location.

The output of step 220 may be an initial CTN model generated. The second plurality unannotated images may then be fed to the initial CTN model to update or revise the initial CTN model to obtain a revised CTN model. Although only one reiteration is shown in FIG. 5, third or fourth or more reiteration may be performed to update or revise or remodel the previously obtained CTN model. FIG. 5 reflects a level of freedom or flexibility of the CTN model generated according to embodiments of the present disclosure in accommodating updates or revisions when additional or new unannotated images become available.

Figure 6:
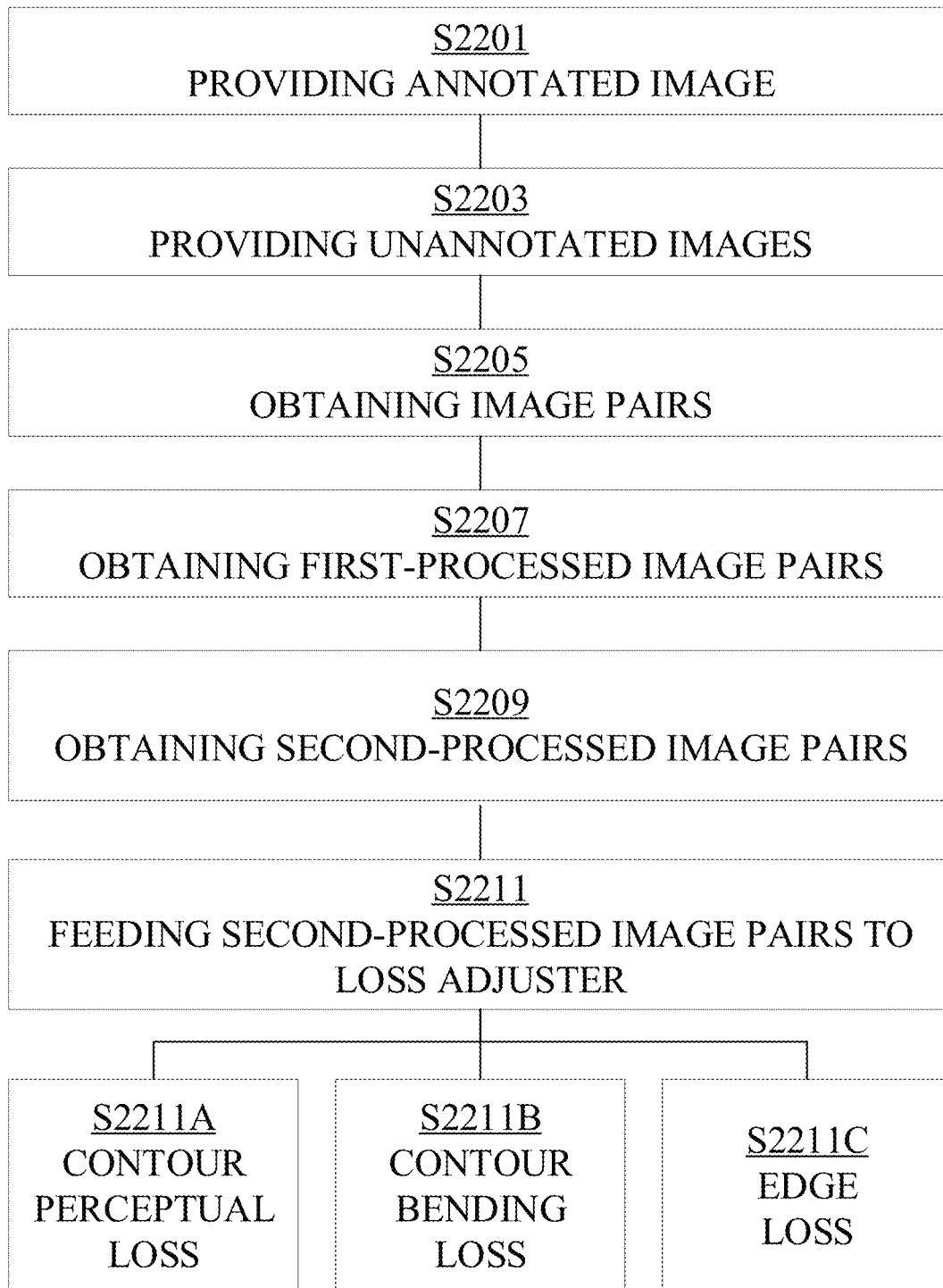
FIG. 6 is a schematic flow chart diagram showing an alternative to the image segmentation method of FIG. 2A according to one or more embodiments of the present disclosure.

FIG. 6 is a flow diagram showing a difference and/or an alternative to the step 220 of FIG. 2A. FIG. 6 differs from FIG. 2A in including step 2211. At step 2211, the plurality of second-processed image pairs is fed to a loss adjuster to obtain a plurality of third-processed image pairs, where the lost adjuster includes a contour perceptual loss identified as 2211A, a contour bending loss identified as 2211B, or an edge loss identified as 2211C.

To train the CTN model with just one exemplar or one annotated image, one or more of the contour perceptual loss, the contour bending loss, or the edge loss are introduced to measure the shape and appearance dissimilarities between the corresponding contour on the exemplar and unlabeled images, respectively.

In certain embodiments, CTNs are tasked with minimizing an energy composed of image and constraint forces. To minimize the energy, CTNs follow the principle of minimizing this energy on aggregate over the entire dataset, learning curve evolution behavior that, as much as possible, works for a variety of samples. In this way, CTNs generalize gracefully as more unlabeled data becomes available.

In certain embodiments, the contour perceptual loss is employed to measure the dissimilarity between the visual patterns of the exemplar contour $C_S$ (or the annotated contour) on the exemplar image $I_S$ (or the annotate image) and the predicted contour $C_p$ (or the output contour) on a target image I (or each of the unannotated images, whether as a training image for model building or as a testing image for model deployment). During training, the target image is an unannotated image; and during deployment, the target image is an image one wishes to segment by applying the segmentation method according to certain embodiments of the present disclosure. The contour perceptual similarities in the graph feature space are measured. GCN graph features are extracted from the VGG-16 feature maps of the two images along the two contours, and their L1 distance is calculated as the contour perceptual loss:

$$L_{perc} = \sum_{i=1,...,N} \|P_S(p_i) - P_p(p_i')\|_1, \quad (7)$$

where Cs={$P_i$}, Cp={$P_i'$}, and $P_S$ and $P_p$ denote the VGG-16 features of $I_S$ and I, respectively. VGG-16 is a Convolutional Neural Network (CNN) model made for the image classification task.

In certain embodiments, the contour perceptual loss employs the use of L1 distance rather than L2 distance, where L2 distance is a value that has been subjected to certain mathematical treatment such as square operation, integration operation, and/or square root operation, and where L1 distance is a value of absolute value.

Because there are always inevitable appearance variations across images, it is hypothesized that the similarity representation between pairs of local image patterns is often limited according to certain aspects, for example, specific texture, context, or shape features. Given that different channels of VGG-16 features capture different characteristics of local image patterns, a distance metric learning with modeling flexibility to select which salient features to match may be more appropriate. The sparsity-inducing nature of L1 distance definition provides additional "selection" mechanism over L2.

The contour perceptual loss is used to guide the evolution of the contour, which has several advantages. First, since each VGG-16 feature captures the image pattern of a neighborhood area with context (for example, receptive field), the contour perceptual loss enjoys a relatively large capture range (for example, convex region around the minimum), making the training of CTNs easier. Second, since the VGG-16 model is trained on ImageNet for classification tasks, its feature is less sensitive to noises and illumination variations, which also benefits the training of CTNs.

If it can be assumed that an exemplar contour is broadly informative to other data samples, then it should be beneficial to use the exemplar shape to ground any predictions on such other samples. Therefore, the present disclosure in certain embodiments further employs the contour bending loss to measure the shape dissimilarity between contours. The loss is calculated as the bending energy of the thin-plate spline (TPS) warping that maps $C_S$ to $C_p$. It is worth noting that TPS warping achieves the minimum bending energy among all warping that map $C_S$ to $C_p$. Since bending energy measures the magnitude of the second order derivatives of the warping, the contour bending loss penalizes more on local and acute shape changes, which are often associated with mis-segmentation.

Given $C_S$ and $C_p$, the TPS bending energy can be calculated as follows.

$$K = (\|p_i' - p_j'\|_2^2 \cdot \log\|p_i' - p_j'\|_2), \quad (8)$$

$$P = (1, x', y'), \quad (9)$$

$$L = \begin{bmatrix} K & P \\ P^T & 0 \end{bmatrix}, \quad (10)$$

$$\mathcal{L}_{bend} = \max\left[\frac{1}{8\pi}(x^T H x + y^T H y), 0\right], \quad (11)$$

To further improve on sensitivity to small and very small segmentation fluctuations, such as deviations in the range of a few pixels, the contour perceptual and bending losses may further be coupled with a third loss, namely, an edge loss. Therefore, obtaining desirably high segmentation accuracies to adequately facilitate the downstream workflows like rheumatoid arthritis quantification, the present disclosure in certain embodiments may further employ an edge loss measuring the image gradient magnitude along the contour, which attracts the contour toward edges in the image. The edge loss is written as:

$$\mathcal{L}_{edge} = -\frac{1}{N} \sum_{p' \in C_p} \|\nabla I(p')\|_2, \quad (12)$$

FIG. 7 is a schematic diagram showing a difference and/or alternative to step 220 of FIG. 2A. FIG. 7 differs from FIG. 2A in further including step 2213. At step 2213, a portion of the plurality of second-processed image pairs is selected for manual contour correction upon determining the contour offset is greater than a preset contour correction threshold, where the contour offset is pre-determined for each of the plurality of second-processed image pairs. The step 2213 may be performed after the step 2209 as shown in FIG. 2A, may be performed after the step 2211 as shown in FIG. 6, or may be performed after step 2215 of FIG. 5.

Any suitable method may be used in selecting the portion of the image pairs for manual correction. The manual correction may include the human-in-the-loop correction. A portion of the plurality of second-processed image pairs may be randomly selected by periodic auditing. In certain embodiments, a particular second-processed image pair or a section thereof may be selected for manual correction when a difference between the contour offset and the preset contour correction threshold is of certain range of pixels, such as a range of 1 to 100 pixels.

Because manual correction is designed to increase fidelity and accuracy but at the cost of labor and machine time, manual correction may be carried out to a pre-determined extent. In certain embodiments, a portion of 1 percent to 30 percent of the plurality of second-processed image pairs may be selected and subject to manual correction.

The manual correction step or the so-called native human-in-the-loop mechanism allows model improvement by learning from corrections. This is a compelling feature for applications demanding extreme precision, for example, measuring the joint space in X-rays. Namely, the manual corrections are formatted as partial contours where users need only redraw incorrectly segmented parts and leave correct parts untouched. These partial contour annotations can be naturally incorporated back into the training via an additional Chamfer loss.

Although important, reducing the annotation cost should not be at the cost of performance. More labels are always helpful to enhance the model's generalization ability and robustness, if available. The present disclosure in certain embodiments provides a mechanism, namely a human-in-the-loop mechanism, to incorporate additional labels and hence to increase fidelity of an output contour within a reasonable cost budget.

The human-in-the-loop mechanism supplements the basic CTN model that has been trained with one exemplar or one annotate image, via finetuning the basic CTN model with more segmentation annotations. In certain embodiments, the CTN model is run on a set of unlabeled images first, and several images with wrong predictions are selected as new samples. Instead of drawing the whole contour from scratch on these new images, the annotator only needs to draw some partial contours, in order to correct the wrong prediction, as illustratively and collectively depicted in FIG. 9. The point-wise training of CTN makes it possible to learn from these partial corrections. Labor cost may be relatively reduced accordingly.

FIG. 9, which includes FIG. 9A-9D, collectively depicts a human-in-the-loop process according to certain embodiments of the present disclosure. FIG. 9A shows a predicted or an output contour. FIG. 9B shows that the annotator corrects its wrong parts with the curves shown to the left. For each corrected contour segment, two points are found in the predicted contour, closest to its start and end as depicted in FIG. 9C, then each predicted point between the two points are assigned to the closest corrected point, as depicted in FIG. 9D. This process helps prevent the point correspondence from being scattered.

Referring further to FIG. 9, a partial contour matching loss may be employed to utilize the partial ground truth contours in CTN training. Denote $\hat{C}$ as a set of partial contours in image I, each element of which is an individual contour segment. For each contour segment $\hat{C}_i \in \hat{C}$, the point correspondence is built between $C_p$ and $\hat{C}_i$ using the approach illustrated in FIG. 9. Denote the corresponding predicted contour segment $$D(\hat{C}_i, C_p) = \sum_{p' \in C_p^{(i)}} \min_{\hat{p} \in \hat{C}_i} \|p' - \hat{p}\|_2, \qquad (13)$$

$$\mathcal{L}_{pcm} = \frac{1}{N} \sum_{\hat{C}_i \in \hat{C}} D(\hat{C}_i, C_p). \qquad (14)$$

$$\min_\theta = \sum_{I \in \mathcal{I}} \lambda_1 \cdot L_{perc} + \lambda_2 \cdot L_{bend} + \lambda_3 \cdot L_{edge} + \lambda_4 \cdot L_{pcm}, \qquad (15)$$

Referring back to FIG. 1, the image segmentation method 100 may further include step 240, which is directed to subjecting a medical image to the CTN model generated at step 220 to identify a target contour on a target anatomical structure. Alternatively, the step 240 may be performed after an update or revision to the CTN model is completed, for example, after step 2215 is completed.

Embodiments of the present disclosure define over certain existing classic or mainstream technologies in the field. Classic segmentation methods include solutions based on directly optimizing a pre-defined energy function. Well known examples of the classic segmentation methods include level-set, ACMs (Active Contour Models), graph-cut, random walker and their variants. Although remaining insightful, these classic segmentation methods are no longer considered the mainstream in the field of imaging technologies.

In the field of existing mainstream imaging field, supervised learning-based segmentation methods use deep learning with examples including fully convolutional networks (FCNs) and its variants. FCNs follow a per-pixel classification framework, where each pixel is classified individually by the deep neural network. Lacking constraint from a global structure, deep learning segmentation methods typically require a large amount of labeled or annotated data pixels to be trained effectively. When training data quantities are insufficient, performance tends to degrade significantly.

Certain other mainstream imaging methodologies include one- and few-shot segmentation approaches which have been studied to address the challenge of lack of well-annotated image data. However, most of these one-/few-shot models focus on natural imagery and leverage a universal dataset with segmentation annotation masks, for example, from MS-COCO (Microsoft Common Objects in Context) which simply do not exist in medical image domains. In addition, considerable performance gaps compared to deeply supervised methods may also be observed with some of these existing one-/few-shot models.

The present disclosure in certain embodiments provides a method and a system for segmenting image data, such as the image segmentation method 200 of FIG. 2 and the image segmentation apparatus of FIG. 1. Certain embodiments involve the employment of a so-called CTN (Contour Transformer Networks) model, which may be a one-shot anatomical structure segmentation method with a natural human-in-the-loop mechanism.

In certain embodiments, the CTN model represents segmentation by learning a contour evolution behavior process via graph convolutional networks, where training of the network requires only one labeled exemplar and leverages additional unlabeled data through newly proposed losses that measure the global shape and appearance consistency of contours. In certain embodiments, the CTN model outperforms non-learning-based methods and performs competitively to some of the existing supervised deep learning approaches. Furthermore, with minimal human-in-the-loop feedback, the performance may be further improved, outperforming even strong well-supervised baselines.

Figure 8:
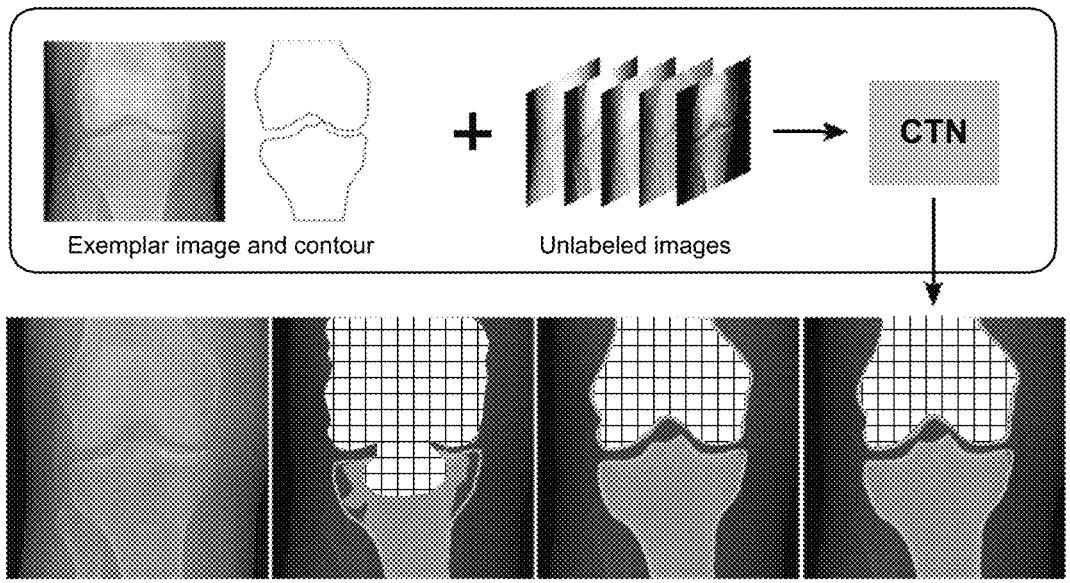
FIG. 8 is a schematic diagram showing comparative image segmentation performance according to one or more embodiments of the present disclosure.

FIG. 8, which collectively includes FIG. 8A-8DD, shows performance variations of a mainstream segmentation work of DeepLab-v3+ given different numbers of training samples in comparison to the CTN model according to embodiments of the present disclosure. FIG. 8A shows an input image. FIG. 8B shows segmentation result from DeepLab-v3+ with 10 samples or 10 annotated images. FIG. 8C shows segmentation result from DeepLab-v3 with 100 annotated images. FIG. 8D shows segmentation result from the CTN model trained with only one annotated image coupled with a set of unannotated images via a process illustratively depicted in FIG. 8DD. FIG. 8 collectively demonstrates that the performance of DeepLab-v3+ degrades significantly when trained using less data. The CTN model according to embodiments of the present disclosure can on the other hand segment the anatomical structure from just one labeled exemplar or one annotated image and a set of unlabeled or unannotated images.

In certain embodiments, for each unannotated image, the annotated image or the exemplar is evolved using GCN (Graph Convolutional Network) which collects image features along the contour and estimates the offset of each contour point. Graph Convolutional Network ("GCN"), or Graph Neural Network ("GNN"), or Graph Convolutional Neural Network ("GCNN") is a type of Neural Network which directly operates on the Graph structure. A typical use of GNN is in node classification, where every node in the graph is associated with a label, and the GCN model is used to predict the label of the nodes without ground-truth. In this node classification setup, each node is associated with a ground-truth label. Given a partially labeled graph, the GCN model is to leverage these labeled nodes to predict the labels of the unlabeled. The GCN model learns to represent each node with information of its neighborhood.

In certain embodiments, a graph is a data structure including two components, vertices and edges. A graph G may be described by the set of vertices V and edges E it contains. Edges may be either directed or undirected, depending on whether there exist directional dependencies between vertices.

In certain embodiments, the image segmentation method 200 of FIG. 2 may be carried out in a manner specified below. Given an exemplar image $I_S$ (or the annotated image) and its segmentation of an anatomical structure $C_S$, the task is to learn an segmentation model from the exemplar $S=\{I_S, C_S\}$ and a set of unlabeled images $I=\{I_i\}$ for this anatomical structure. Each segmentation is modeled as a contour, defined by a number of spaced-apart vertices, $C=\{p_1, p_2, \ldots, p_N\}$. In certain embodiments, the spaced-apart vertices may be evenly distributed; and in other embodiments, the number of the spaced-apart vertices may be a predetermined or a fixed number. Given a target image I, the exemplar contour $C_S$ is placed at the center of the image as the initial contour, and CTNs model the contour evolution behavior to displace the contour vertices to the correct boundary. The CIN model can be written as:

$$C_p = C_S + F_\theta(C_S, I) \quad (1)$$

where $F_\theta$ denotes the CTNs with weights θ. CTNs take the exemplar and the target image as input, and outputs estimated offsets of contour vertices:

$$F_\theta(I_S, C_S, I) = \{\Delta p_1, \Delta p_2, \ldots, \Delta p_N\}. \quad (2)$$

Due to the lack of labels on the unannotated images I, deeply supervised losses cannot be used to train CTNs. Here, a new training strategy is established, exploiting the advantage of modeling segmentation as contour. In particular, instead of comparing model predictions with ground truth as in a fully-supervised or a deeply supervised setting, $C_p$ is compared with the exemplar contour $C_S$, by measuring the dissimilarities between the contours' shapes and the local image patterns along the contours. This is based on the insight that the correct segmentation in the target image should be similar to the exemplar contour in its overall shape, as well as local image appearance patterns of corresponding vertices.

In certain embodiments, two losses are introduced to measure the shape and appearance dissimilarities, namely contour perceptual loss, denoted as $L_{perc}$, and contour bending loss, denoted as $L_{bend}$. In addition, a gradient-based loss, denoted as $L_{edge}$, may also be employed to further drive the contour to edges.

Training of CTNs can then be written as:

$$\min_\theta \sum_{I \in I} \lambda_1 \cdot L_{perc} + \lambda_2 \cdot L_{bend} + \lambda_3 \cdot L_{edge}, \quad (3)$$

where $\lambda_1, \lambda_2, \lambda_3$ are weighting factors of the three losses.

These losses help imitate the human's behavior in learning contouring from one exemplar, for example, drawing new contours by referring to the exemplar to compare shapes and local appearances. Training CTNs on aggregating over a dataset of unlabeled images is relatively more robust and more stable, and can reduce boundary leakage on individual cases often encountered by certain existing methods such as ACMs.

Figure 10:
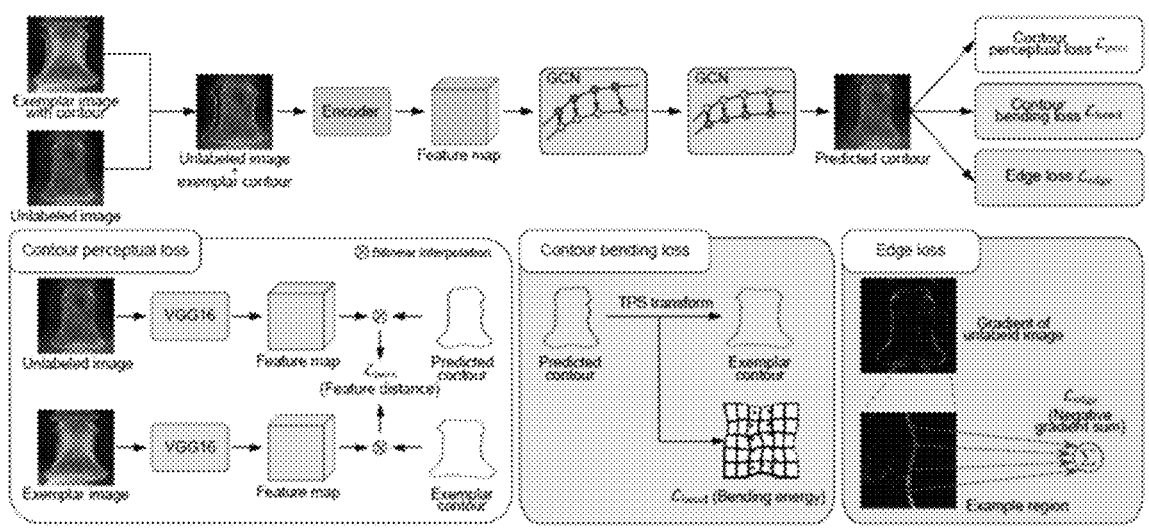
FIG. 10 is a schematic diagram of the image segmentation method according to one or more embodiments of the present disclosure.

FIG. 10 illustratively depicts an image segmentation method according to embodiments of the present disclosure, such as the image segmentation method 200 of FIG. 2. The image segmentation method depicted in FIG. 10 includes an image encoding block (or the image encoder) and subsequent cascaded contour evolution blocks (or the contour tuner). Any suitable techniques may be employed to carry out the image encoding block part of the CTN modeling. In certain embodiments, ResNet-50 is employed as the backbone of image encoding block. ResNet-50 takes the target image as input, and outputs a feature map encoding local image appearances, denoted as:

$$f_e = F_{enn} \quad (4)$$

In certain embodiments, the CTN includes a CNN as the image encoder, coupled subsequently with one or more contour evolution blocks such as one or more GCNs as the image tuner to fine tune the contour evolution. The thus-formed CNN-GCNs coupling carries out the one-shot segmentation, which is then further calibrated or adjusted via a combination of one or two or three of the three losses, namely the contour perceptual loss, the contour bending loss, and the edge loss, and/or via a human-in-the-loop correction step, for the CTN to ultimately arrive as a trained model.

Further according to FIG. 10, the CTN is trained to fit a contour to the object boundary by learning from one exemplar. In training, the process takes a labeled exemplar and a set of unlabeled images as input. After going through a CNN encoder as the image encoder and cascaded GCN contour evolution blocks as the contour tuner, the CTN model outputs the predicted contour as the output contour.

In the process illustratively depicted in FIG. 10, and according to certain embodiments, the network is trained using three proposed one-shot losses, namely the contour perceptual loss, contour bending loss and edge loss, aiming to let the predicted contour have similar contour features with the exemplar. In certain embodiments, the CTN model is trained using the contour perceptual loss, and optionally in combination with one or both of the contour bending loss and the edge loss.

All contour evolution blocks have the same multi-layer GCN structure, although weights are not shared. The GCN takes the contour graph with vertex features as input, denoted as $G=(C, E, Q)$, where C denotes the vertices, E denotes the connectivity, and Q denotes the vertex features. Each vertex in the contour is connected to four neighboring vertices, two on each side. The vertex features are extracted from the feature map $f_e$ at vertex locations via interpolation, which can be written as:

$$Q=\{f_e(p)\}_{p \in C}. \qquad (5)$$

The k-th contour evolution block takes the graph $G_k=(C_k, E, Q_k)$ as input, and outputs offsets of the contour vertices. These blocks are cascaded to evolve the contour:

$$C_{k+1}=C_k+F_{gcn}^k(C_k,E,Q_k). \qquad (6)$$

The contour is initialized using the exemplar contour, $C_0=C_S$, and the output of the last contour evolution block is the final output $C_p$.

An evaluation on the image segmentation method according to certain embodiments of the present disclosure is conducted on three X-ray image datasets focusing on anatomical structures of knee, lung and phalanx, respectively. For the knee image dataset, 212 knee X-ray images are collected from the Osteoarthritis Initiative (OAI) database. Each image is cropped from the original scan with automatic knee joint detection, and resized to 360×360 pixels. The dataset is randomly split into 100 training and 112 testing images. Under a rheumatologist's guidance, the boundaries of tibia and femur are manually annotated against background, forming three regions. For this knee image set, the exemplar image is one of the 100 training images. The exemplar image may be randomly selected from the 100 training images. While the 100 training images are respectively from 100 individual patients, each of the knee images contains information on both knees of a single patient. An ROI is then extracted from each knee.

The lung image dataset is obtained from the public JSRT dataset with 247 posterior-anterior chest radiographs, where lung segmentation labels originate from the SCR dataset. Left lung and right lung ROIs are extracted from the image and resized to 512×256 pixels. The 124 images with odd indices are used for training, and the 123 images with even indices for testing.

The phalanx image dataset is obtained from hand X-ray images from patients with rheumatoid arthritis. Without loss of generality, 202 ROIs of proximal phalanx are extracted from images based on hand joint detection and sized to 512×256 pixels. The dataset is randomly split into 100 training and 102 testing images. The phalanx boundaries or contours of these images are manually annotated under a rheumatologist's guidance.

The results here are compared with two non-learning-based methods: MorphACWE and MorphGAC, both of which are based on ACMs, which evolves an initial contour to the object by minimizing an energy function. The exemplar contour according to certain embodiments is used as the initial contours.

The results in Table 1 show that the method based on the CTN model according to certain embodiments of the present disclosure comfortably outperforms both MorphACWE and MorphGAC.

TABLE 1

Performances of the CTN method (represented with a tag) and seven compared-to methods on three datasets.

| | | Knee | | Lung | | Phalanx | |
| --- | --- | --- | --- | --- | --- | --- | --- |
| Method | | IoU(%) | HD(px) | IoU(%) | HD(px) | IoU(%) | HD(px) |
| Non-learning-based | MorphACWE | 65.89 | 54.07 | 76.09 | 55.35 | 74.33 | 69.13 |
| | MorphGAC | 87.42 | 15.78 | 70.79 | 45.67 | 82.15 | 24.73 |
| | CANet | 29.22 | 175.86 | 56.90 | 73.46 | 60.90 | 67.13 |
| One-shot | Brainstorm | 90.17 | 29.07 | 77.13 | 43.28 | 80.05 | 30.30 |
| | CTN* | 97.32 | 6.01 | 94.75 | 12.16 | 96.96 | 8.19 |
| Fully-supervised | UNet | 96.60 | 7.14 | 95.38 | 12.48 | 95.76 | 10.10 |
| | DeepLab | 97.18 | 5.41 | 96.18 | 10.81 | 97.63 | 6.52 |
| | HRNet | 96.99 | 5.18 | 95.99 | 10.44 | 97.47 | 7.03 |

The results shown in Table 1 are directed to the testing images after a CTN model is trained according to the exemplar and the training images. According to Table 1, on average the method based on the CTN model achieves 16.22% higher IoU (Intersection-over-Union) and 19.94 pixels less HD (Hausdorff Distance) than MorphGAC, the better of the two, namely MorphACWE and MorphGAC. Segmentation result visualizations in FIG. 11 confirm that these two approaches, namely MorphACWE and MorphGAC, cannot localize anatomical structures accurately, especially when the boundary of such structures are not clear, such as in the lung image. Because these two methods are based on ACMs, they predict contours by minimizing hand-crafted energy functions for a single image. In contrast, CTNs learn from an exemplar contour to guide the contour transformation for the entire training set.

At least because the exemplar or the annotated image may be anatomically specific, a CTN model specific for a certain anatomical structure may be desirable. For example, and in certain embodiments, the segmentation method includes generating a CTN model specific for human knees, a CTN model specific for human lungs, and a CTN model specific for human phalanx.

The CTN model method is also compared with two existing one-shot segmentation methods, namely CANet and Brainstorm tabulated in Table 1. CANet is trained on the PASCAL VOC 2012 dataset and can segment unseen objects by referring to the support set. Brainstorm addresses the one-shot problem by learning both spatial and appearance transformations between images in a dataset and further synthesizes image-label pairs to train the segmentation model. In each training set, the distance of each image is compared to all other images in the VGG feature space, and the support set is selected to be the image with the smallest distance.

As further shown in Table 1, the CTN model is compared with deeply supervised methods in image segmentation performance. The performance of three fully-supervised methods, namely UNet, DeepLab-v3+ and HRNet-W18, are evaluated on the collected datasets. Each of UNet, DeepLab-v3+ and HRNet-W18 are trained for 500 epochs with all available training data, for example, 100 knee images, 124 lung images and 100 phalanx images. Post-processing procedures are excluded for fair comparison.

On average, the CTN model trained with only one exemplar, performs comparably with the fully-supervised UNet, and falls behind DeepLab, the best of the three, by 0.66% in IoU and 1.21 pixel in HD, respectively. These results demonstrate that with only one exemplar, CTNs can compete head-to-head with very strong deeply supervised baselines. We note that these deeply supervised methods predict per-pixel labels. This can cause them to lose the integrity of their boundaries, for example, some small "islands" in lung masks of FIG. 11. In contrast, CTNs can retain the integrity of the contour, an important aspect in assessing visual quality.

Figure 11:
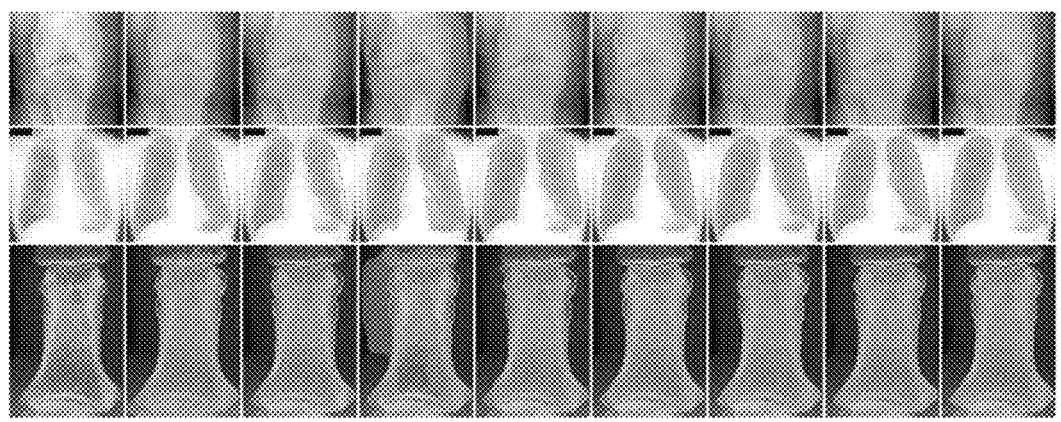
FIG. 11 is a schematic diagram showing comparative image segmentation performance according to one or more embodiments of the present disclosure.

FIG. 11 collectively shows segmentation results of three example images. From top to bottom, the images are from the testing set of the knee, lung and phalanx dataset, respectively. The boundary of the ground truth segmentation is drawn on all results for comparison. Column 11A is directed to an input image. Column 11B is directed to MorphACWE (non-learning-based). Column 11C is directed to MorphGAC (non-learning-based). Column 11D is directed to CANet (one-shot). Column 11E is directed to Brainstorm (one-shot). Column 11F is directed the CTN model according to certain embodiments of the present disclosure. Column 11G is directed to UNet (fully supervised). Column 11H is directed to DeepLab (fully supervised). Column 11I is directed to HRNet (fully supervised).

For each segmentation result shown in FIG. 11, segmentation accuracy is evaluated by Intersection-over-Union (IoU) and for the corresponding annotated contour by the Hausdorff distance (HD). For those methods that do not explicitly output annotated contours, the external contour of the largest region of each class is extracted from the segmentation mask. On the knee dataset, the average HD of femur and tibia segmentation is reported.

Regarding the results shown in FIG. 11, hyper-parameter settings are N=1000, $\lambda_1$=1, $\lambda_2$=0.25, $\lambda_3$=0.1, $\lambda_4$=1. The network is trained using the Adam optimizer with a fixed learning rate of $1\times10^{-4}$, a weight decay of $1\times10^{-4}$ and a batch size of 12 for 500 epochs. The training on each dataset takes about 3 hours with 3 Nvidia Titan V GPUs. The same settings are used for both one-shot training and human-in-the-loop finetuning.

According to Table 1, CANet achieves only 49.01% IoU on average. The poor performance is speculated to be caused by the domain gap between natural images and medical images. Brainstorm yields reasonable results with 82.45% IoU and 34.22 HD, on average, but is still dramatically lower than the performance of the CTN method, of which the IoU is 96.34% and the HD is 8.79.

FIG. 11 shows segmentation masks of CANet and Brainstorm outputs bear fuzzy boundaries. Their synthesized images are observed to contain some visual patterns that do not exist in the real image, which may affect their segmentation model training.

Another advantage of CTN method is that it can directly consume as much unlabeled data as is available to model the contour evolution behavior. In principle, the more unlabeled images CTN sees, the more robust it will be to variations in testing. To confirm this, the CTN method is evaluated by expanding both the training sets of knee and phalanx from 100 images to 500 images, with the exemplar unchanged. The expansion experiment is not conducted on the lung dataset, because there are no more images available in the original lung dataset.

As Table 2 shows, with more unlabeled images used for training, the model performance improves on average by 0.29% in IoU and 0.76 in HD. The improvement on the phalanx dataset is larger than that on the knee dataset, likely because the former is a more complex structure, so the CTN needs to see more training images to reach its upper bound. Because unlabeled data is so much accessible in medical image applications, these results indicate that CTNs can effectively make use of these unlabeled images that are more available and hence more abundant.

TABLE 2

Using more unlabeled images in training.

| Number of unlabeled images | Knee IoU(%) | Knee HD(px) | Phalanx IoU(%) | Phalanx HD(px) |
|---|---|---|---|---|
| 100 | 97.32 | 6.01 | 96.96 | 8.19 |
| 500 | 97.53 | 5.73 | 97.33 | 6.96 |

According to certain embodiments, an ablation experiment is conducted to validate the effectiveness of the three one-shot losses, namely the contour perceptual loss $L_{perc}$, the contour bending loss $L_{bend}$, and the edge loss $L_{edge}$. The results are shown in Table 3. As can be seen, these three losses are shown in general to improve the image segmentation method, with an average IoU reduction of 1.72%, 4.12%, and 4.32% for $L_{perc}$, $L_{bend}$, and $L_{edge}$, respectively. Effect of the contour bending loss on the knee dataset is shown to be of a comparatively lesser weight; this likely is due to the possibility that the knee images share more similar appearance features along the contour. Thus, the contour can be located well with contour perceptual loss and edge loss alone, while the contour bending loss enforces too much regularization and leads to slightly worse results.

TABLE 3

Ablation study. One of the three losses is removed from Equation 3 each time the model is re-trained.

| $L_{perc}$ | $L_{bend}$ | $L_{edge}$ | Knee | | Lung | | Phalanx | |
|---|---|---|---|---|---|---|---|---|
| | | | IoU(%) | HD(px) | IoU(%) | HD(px) | IoU(%) | HD(px) |
| | ../ | ../ | 94.43 | 11.90 | 92.99 | 16.22 | 96.45 | 9.84 |
| ../ | | ../ | 97.50 | 5.87 | 84.93 | 36.74 | 94.24 | 26.13 |
| ../ | ../ | | 94.62 | 8.28 | 87.45 | 26.51 | 94.01 | 15.81 |
| ../ | ../ | ../ | 97.32 | 6.01 | 94.75 | 12.17 | 96.96 | 8.19 |

In certain embodiment, the CTN method further includes a human-in-the-loop mechanism. The approach is designed to simulate how human correction is performed in the real scenarios. Specifically, an annotator is likely to correct more severe errors with higher priority. To simulate this, the CTN model is first run on the images in each training set to calculate their HD to the ground-truth. Then, the worst n % samples are selected as candidates for correction.

For each predicted contour in these samples, pointwise L2 distances are calculated to the ground-truth and those with distances larger than 3 pixels are grouped as errors. These errors are grouped into segments to correct and the corresponding ground-truth are used as human corrections. Under this setting, the CTN model is fine-tuned with n=10, 25 and 100, corresponding to 10%, 25% and 100% training samples with human corrections, respectively.

Figure 12:
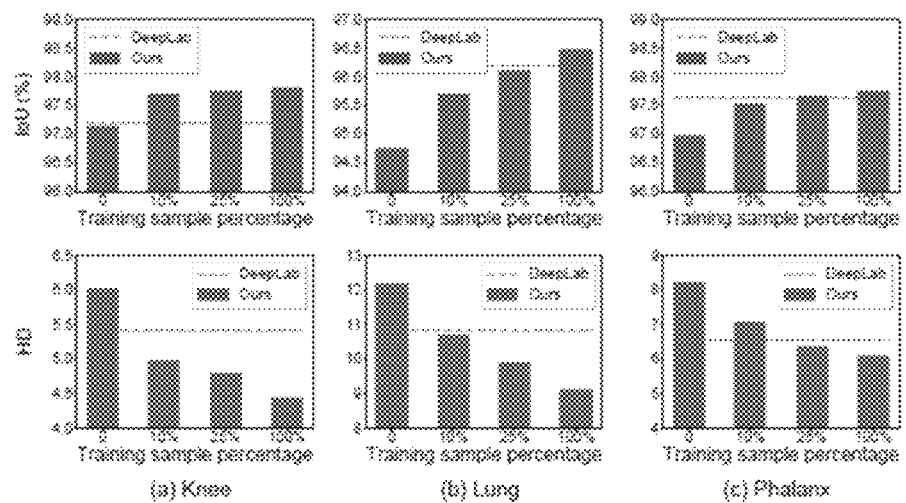
FIG. 12 is a schematic diagram showing comparative image segmentation performances according to one or more embodiments of the present disclosure.

FIG. 12 shows the performances of the original CTN model (without human correction) and these three CTN models (with human correction). According to FIG. 12, the CTN model consistently improves with the human corrections. Specifically, using an additional 10% of samples with human correction, the CTN model improves the IoU from 96.34% to 96.97% and reduces the HD from 8.79 to 7.57, respectively. When using 25% such samples, the CTN model outperforms DeepLab which uses all samples, (IoUs of 97.17% vs 97.0%, and HDs of 7.01 vs 7.58). With all training samples, the CTN model reaches 97.33% on IoU and 6.5 on HD.

It is worth noting that even when all training samples are used, the labor associated with the CTN model is still less than that required with DeepLab, as only partial corrections are required by CTNs. Thus, these results indicate that our human-in-the-loop mechanism can help CTNs achieve better performance than deeply supervised methods such as DeepLab with considerably less annotation effort.

Embodiments of the present disclosure provide a one-shot segmentation method, contour transformer network, which uses one labeled exemplar and a set of unlabeled images to train a segmentation model for anatomical structures in medical images. To enable the exemplar-based one-shot training, contour perceptual loss, contour bending loss and edge loss are employed. With the CTN method, human-in-the-loop feedback can naturally be incorporated to further improve the model's performance. Experiment results on three X-ray image datasets demonstrate the effectiveness of the proposed method and the human-in-the-loop mechanism. The one-shot segmentation method via the CTN model performs competitively to certain mainstream fully supervised deep learning approaches. With minimal human-in-the-loop feedback, the CTN model method even outperforms strong fully supervised baselines.

Certain embodiments of the present disclosure provide a four-fold contribution to the technical field of medical image segmentation. The first of the four-fold contribution includes generation of an integrated framework that is configured to perform one-shot learning with incorporated human-in-the-loop feedback, aiming to achieve reasonably enhanced quantitative performance coupled with manageable annotation costs. The second of the four-fold contribution is directed to modification of the integrated framework with a contour perceptual loss that effectively measures the local visual similarities between corresponding points, such as contour vertices, from parameterized contours on the exemplar and unlabeled images. The third of the our-fold contribution is directed to modification of the integrated framework with a contour bending loss that effectively measures global shape difference between contours on the exemplar and unlabeled images. The fourth of the four-fold contribution is directed to demonstration on three datasets that CTNs achieve state-of-the-art one-shot segmentation performance, performs competitively compared to supervised alternative, and even outperforms them with minimal human-in-the-loop feedback.

Going back to FIG. 1, the processor 102 may include any appropriate processor(s). In certain embodiments, processor 102 may include multiple cores for multi-thread or parallel processing. Processor 102 may execute sequences of computer program instructions to perform various processes, such as method 200 of FIG. 2. Storage medium 104 may be a non-transitory computer-readable storage medium, and may include memory modules, such as ROM, RAM, flash memory modules, and erasable and rewritable memory, and mass storages, such as CD-ROM, U-disk, and hard disk, etc. The communication module 108 may include network devices for establishing connections through a network. Display 106 may include any appropriate type of computer display device or electronic device display (e.g., CRT or LCD based devices, touch screens). Peripherals 112 may include additional I/O devices, such as a keyboard, a mouse, and so on. The processor 102 may be configured to execute instructions stored on the storage medium 104 and perform various operations related to an image segmentation method such as method 200 of FIG. 2.

Although the present disclosure has been shown and described with reference to specific exemplary embodiments thereof, those skilled in the art will understand that, without departing from the spirit and scope of the present disclosure as defined by the appended claims and their equivalents, various changes in form and detail may be made to the present disclosure. Therefore, the scope of the present disclosure should not be limited to the embodiments described above, but should be determined not only by the appended claims, but also by the equivalents of the appended claims.

What is claimed is:

1. An image segmentation method, comprising: generating a CTN (contour transformer network) model for image segmentation, wherein the CTN model is generated by:

providing an annotated image, the annotated image including an annotated contour;

providing a plurality of unannotated images;

pairing the annotated image to each of the plurality of unannotated images to obtain a plurality of image pairs;

feeding the plurality of image pairs to an image encoder to obtain a plurality of first-processed image pairs, one of the plurality of first-processed image pairs showing a first output contour with a first vertices offset distance relative to the annotated contour of the annotated image; and feeding the plurality of first-processed image pairs to a contour tuner to obtain a plurality of second-processed image pairs, wherein the one of the plurality of first-processed image pairs corresponds to one of the plurality of second-processed image pairs, and wherein the one of the plurality of second-processed image pairs shows a second output contour with a second vertices offset distance smaller than the first vertices offset distance.

2. The image segmentation method of claim 1, wherein pairing the annotated image to each of the plurality of unannotated images to obtain the plurality of image pairs includes:

placing the annotated contour at a center portion of each of the plurality of unannotated images; and setting the annotated contour as an initial contour of each of the unannotated images.

3. The image segmentation method of claim 1, wherein feeding the plurality of image pairs to the image encoder to obtain the plurality of first-processed image pairs includes:

defining the annotated contour with a number of vertices;

generating an output contour according to each of the plurality of image pairs;

determining a number of vertices offset distances of the output contour relative to the number of vertices on the annotated contour; and obtaining the plurality of first-processed image pairs, wherein the plurality of first-processed image pairs include the number of vertices offset distances as determined.

4. The image segmentation method of claim 1, wherein feeding the plurality of first-processed image pairs to the contour tuner to obtain the plurality of second-processed image pairs includes:

identifying a number of vertices on the first output contour; and moving the first output contour to be closer toward the second output contour at each of the number of vertices.

5. The image segmentation method of claim 1, wherein generating the CTN model further includes:

feeding the plurality of second-processed image pairs to a loss adjuster to obtain a plurality of third-processed image pairs, wherein the lost adjuster includes a contour perceptual loss and optionally includes one or both of a contour bending loss and an edge loss.

6. The image segmentation method of claim 1, wherein generating the CTN model further includes:

determining a contour offset distance for each of the plurality of second-processed image pairs; and selecting a corresponding portion of the plurality of second-processed image pairs for manual contour correction upon determining the contour offset distance is greater than a preset contour correction threshold.

7. The image segmentation method of claim 6, wherein a difference between the contour offset distance and the preset contour correction threshold is of a range of 1 to 100 pixels.

8. The image segmentation method of claim 6, wherein the corresponding portion is of 1 percent to 30 percent of the plurality of second-processed image pairs.

9. The image segmentation method of claim 1, wherein generating the CTN model further includes:

providing a second plurality of unannotated images;

pairing the annotated image to each of the second plurality of unannotated images to obtain a second plurality of image pairs; and feeding the second plurality of image pairs to the image encoder and the contour tuner.

10. The image segmentation method of claim 1, further comprising:

subjecting a medical image to the CTN model to identify a target contour on a target anatomical structure.

11. The image segmentation method of claim 1, wherein the annotated image includes an image of a human knee, a human lung, or a human phalanx.

12. The image segmentation method of claim 1, wherein the annotated contour is added manually.

13. An image segmentation apparatus, comprising: a memory and processor coupled to the memory, the processor being configured to perform: generating a CTN (contour transformer network) model for image segmentation, including:

providing an annotated image, the annotated image including an annotated contour;

providing a plurality of unannotated images;

pairing the annotated image to each of the plurality of unannotated images to obtain a plurality of image pairs;

feeding the plurality of image pairs to an image encoder to obtain a plurality of first-processed image pairs, one of the plurality of first-processed image pairs showing a first output contour with a first vertices offset distance relative to the annotated contour of the annotated image; and feeding the plurality of first-processed image pairs to a contour tuner to obtain a plurality of second-processed image pairs, wherein the one of the plurality of first-processed image pairs corresponds to one of the plurality of second-processed image pairs, and wherein the one of the plurality of second-processed image pairs shows a second output contour with a second vertices offset distance smaller than the first vertices offset distance.

14. The image segmentation apparatus of claim 13, wherein pairing the annotated image to each of the plurality of unannotated images to obtain the plurality of image pairs includes:

placing the annotated contour at a center portion of each of the plurality of unannotated images; and setting the annotated contour as an initial contour of each of the unannotated images.

15. The image segmentation apparatus of claim 13, wherein feeding the plurality of image pairs to the image encoder to obtain the plurality of first-processed image pairs includes:

defining the annotated contour with a number of vertices;

generating an output contour according to each of the plurality of image pairs;

determining a number of vertices offset distances of the output contour relative to the number of vertices on the annotated contour; and obtaining the plurality of first-processed image pairs, wherein the plurality of first-processed image pairs include information of the number of vertices offset distances as determined.

16. The image segmentation apparatus of claim 13, wherein feeding the plurality of first-processed image pairs to the contour tuner to obtain the plurality of second-processed image pairs includes:
- identifying a number of vertices on the first output contour; and
- moving the first output contour to be closer toward the second output contour at each of the number of vertices.

17. The image segmentation apparatus of claim 13, wherein generating the CTN model further includes:
- feeding the plurality of second-processed image pairs to a loss adjuster to obtain a plurality of third-processed image pairs, wherein the lost adjuster includes a contour perceptual loss and optionally includes one or both of a contour bending loss and an edge loss.

18. The image segmentation apparatus of claim 13, wherein generating the CTN model further includes:
- providing a second plurality of unannotated images;
- pairing the annotated image to each of the second plurality of unannotated images to obtain a second plurality of image pairs; and
- feeding the second plurality of image pairs to the image encoder and the contour tuner.

19. A non-transitory computer-readable storage medium storing a plurality of instructions, wherein the plurality of instructions when executed by a processor causes the processor to perform: generating a CTN (contour transformer network) model for image segmentation, including:
- providing an annotated image, the annotated image including an annotated contour;
- providing a plurality of unannotated images;
- pairing the annotated image to each of the plurality of unannotated images to obtain a plurality of image pairs;
- feeding the plurality of image pairs to an image encoder to obtain a plurality of first-processed image pairs, one of the plurality of first-processed image pairs showing a first output contour with a first vertices offset distance relative to the annotated contour of the annotated image; and
- feeding the plurality of first-processed image pairs to a contour tuner to obtain a plurality of second-processed image pairs, wherein the one of the plurality of first-processed image pairs corresponds to one of the plurality of second-processed image pairs, and wherein the one of the plurality of second-processed image pairs shows a second output contour with a second vertices offset distance smaller than the first vertices offset distance.

20. The non-transitory computer-readable storage medium of claim 19, wherein generating the CTN model further includes:
- feeding the plurality of second-processed image pairs to a loss adjuster to obtain a plurality of third-processed image pairs, wherein the lost adjuster includes a contour perceptual loss and includes one or both of a contour bending loss and an edge loss.

* * * * *